April 26, 1932.  I. J. DU BOIS  1,855,388
AUXILIARY GAS TANK
Filed Dec. 13, 1930
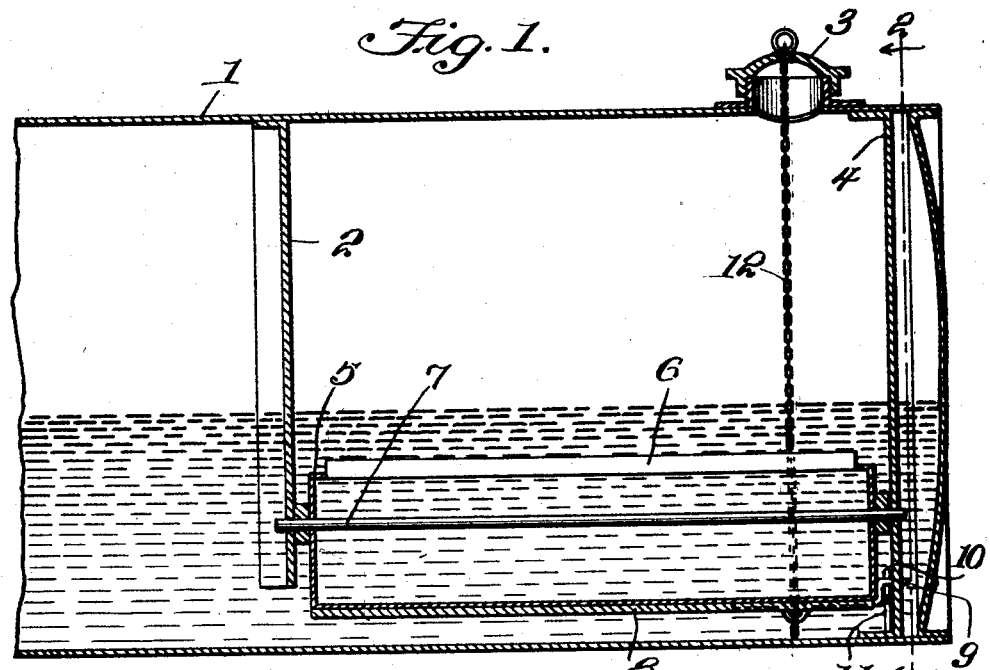
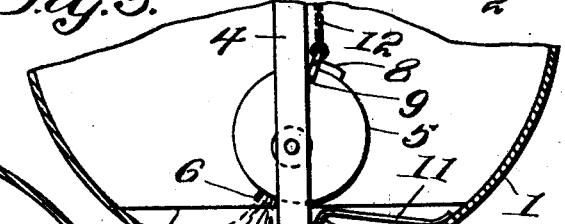
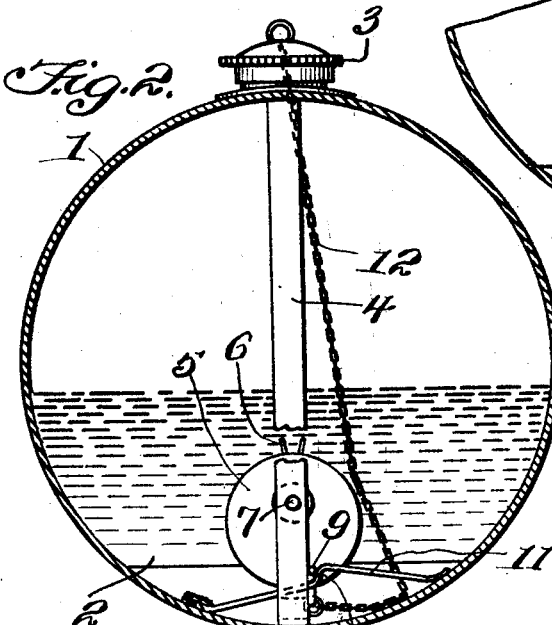
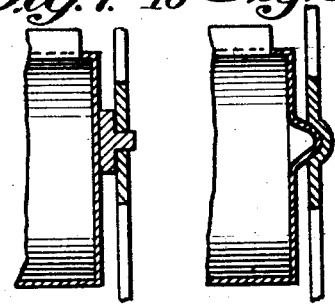
Isaac J. DuBois
INVENTOR
BY Victor J. Evans
and A. L. Evans ATTORNEYS
WITNESS: J. T. L. Wright Patented Apr. 26, 1932

1,855,388

UNITED STATES PATENT OFFICE

ISAAC J. DU BOIS, OF DETROIT, MICHIGAN

AUXILIARY GAS TANK

Application filed December 13, 1930. Serial No. 502,206.

My present invention has reference to an auxiliary tank for the gasoline supply tank for the motors of automobiles or like vehicles, and my object is the provision of an auxiliary tank comprising a preferred cylindrical member having its end closed and eccentrically journaled between supporting plates and the main gasoline tank, the auxiliary tank having a mouth arranged longitudinally thereon and a weight disposed diametrically opposite the mouth, and whereby the tank is normally influenced by the weight to bring its mouth in a position to receive gasoline from the main tank, there being spring latching means for holding the auxiliary tank in such position, together with the flexibly connected closure cap of the main tank and the auxiliary tank which, when pulled will cause the turning of the auxiliary mouth to dump the contents thereof into the main tank and whereby should the main supply of gasoline become exhausted the gasoline from the auxiliary tank will be amply sufficient to permit of the operation of the engine so that the vehicle can be propelled to a gasoline station for the refilling of the main tank.

To the attainment of the foregoing the invention consists in the improvement hereinafter described and definitely claimed.

In the drawings:

Figure 1 is a central longitudinal sectional view through the main gasoline supply tank of an automobile engine, provided with the improvement, the improvement being in section.

Figure 2 is a sectional view approximately on the line 2—2 of Figure 1.

Figure 3 is a detail substantially similar section but showing the auxiliary tank turned to drain the contents therefrom into the main tank.

Figure 4 is a detail sectional view to illustrate one manner in which the auxiliary tank may be pivotally supported.

Figure 5 is a similar view illustrating another manner in which the auxiliary tank may be pivotally supported.

Figure 6 is a detail perspective view to illustrate the spring engaging stop formed integrally with an eye for the flexible element or chain.

The main gasoline tank 1 for supplying gasoline to the engine of a motor for an automobile or the like is of the ordinary construction, the same having arranged therein the usual baffle plate 2 and being provided with the filler opening that is normally closed by the cap 3. When the tank 1 is provided with two spaced baffle plates my improvement is arranged between these plates but when the tank is supplied with only one of such baffle plates, as disclosed by the drawings I spot weld in the tank 1, a suitable distance away from the splash plate 2 the angle ends of a vertically arranged plate 4. The filler opening for the tank 1 is arranged between the plates 2 and 4.

The auxiliary tank, in the showing of the drawings, is in the nature of a cylinder 5 that has both of its ends closed and provided with a longitudinal slit in one of its faces and the metal at points adjacent the slit is bent outwardly to form the lips 6 for the inlet mouth of the auxiliary tank. The ends of the auxiliary tank are eccentrically provided with or have attached thereto trunnions 7. In Figure 4 the trunnions are attached while in Figure 5 the trunnions are formed by bulging outwardly the ends of the tank. The trunnions 7 are received in suitable bearings in the plates 2 and 4 to arrange the auxiliary tank adjacent to but at a suitable distance above the bottom of the main tank 1. The trunnions 7 are disposed opposite the lips 6 and the outer periphery of the tank diametrically opposite the lips has fixed thereon a weight 8. The weight is preferably spot welded to the auxiliary tank.

On one end of the auxiliary tank 5, adjacent to the weight 8 I spot weld or otherwise fix a stop element which may be in the nature of a short rod or staple 9 and this stop rod is designed to be engaged by a shoulder 10 provided at the juncture of the angle arms 11 of the spring plate. One end of the spring plate is welded to the bottom of the tank 1 and the other being free to slide against the inner wall of the tank. Connected to the closure 3 and to the bottom of the auxiliary tank to one side of the weight 8 there is a flexible element such as a chain 12. This chain is of a length whereby the closure 3 may be removed from the inlet mouth of the tank 1 to permit of the said tank receiving therein a supply of gasoline. A quantity of the gasoline will flow into the auxiliary tank 5 as will, it is thought, be apparent. The cap is replaced and should the supply of gasoline in the tank 1 become exhausted, the closure 3 is again removed and a pull is exerted upon the flexible element 12 sufficient to turn the eccentrically journaled auxiliary tank 5 to bring the mouth thereof opposite the bottom of the main tank 1 so that the supply of gasoline from the auxiliary tank will be delivered into the main tank. The turning of the auxiliary tank will bring its stop element 9 off of the shoulder 10 of the spring catch 11 as will, it is thought be apparent, and when the flexible element 12 is released the weight 8 will return the auxiliary tank to its initial position so that the stop element 9 thereon will be again engaged by the shoulder 10 of the spring catch 11 and the mouth of the auxiliary tank will be thus again in a position to receive therethrough the gasoline with which the main tank 1 is replenished. The auxiliary tank is of a size and capacity to hold therein a sufficient quantity of gasoline to permit of the engine of an automobile being driven for a desired distance, such distance being sufficient to propel the machine to a fueling station and it is believed the foregoing description when read in connection with the accompanying drawing will fully set forth the simplicity of the construction and the manifest advantages thereof.

In Figure 6 I weld, solder or otherwise secure on the outer face of the auxiliary tank a rod 13 which may be in the nature of a strong wire member. The rod is centrally offset or widened to provide an outwardly bulged portion in the nature of an eye 14 to which the end of the flexible pull element is connected. One end of the rod 13 is bent angularly over one side of the tank and is from thence extended to provide a stop finger 15 designed to ride over the spring 11 and to engage with the shouldered portion 10 thereof for holding the auxiliary tank in the position disclosed by Figures 1 and 2 of the drawings.

Having described the invention, I claim:

1. A main gasoline supply tank for the engines of automobiles and the like having an auxiliary supply tank eccentrically journaled therein adjacent to the bottom thereof, said auxiliary tank having a mouth and having a weight arranged diametrically opposite the mouth whereby the tank is normally turned to sustain the mouth in a line with the top of the main tank, a spring catch for holding the auxiliary tank in such position and a pull element loosely connected to the auxiliary tank and extending through the main tank to cause the turning of the auxiliary tank to bring the mouth thereof in a line with the bottom of the main tank.

2. A main supply tank for the purpose set forth having a filler mouth, a cap closing the filler mouth, a splash plate and another plate spaced from the splash plate, a cylindrical auxiliary tank eccentrically journaled between the plates, said tank having a mouth and outwardly directed lips for the mouth and the said mouth being arranged close to the trunnions for the auxiliary tank, said auxiliary tank being weighted to normally retain the mouth thereof upwardly on the main tank, a stop element on one end of the auxiliary tank, a spring catch having one end welded in the main tank, comprising angle arms and a shoulder between the arms and which shoulder is designed to engage with a stop element on the auxiliary tank and a flexible element secured to the auxiliary tank and to the closure for the main tank.

In testimony whereof I affix my signature.

ISAAC J. DU BOIS.